Oct. 26, 1971   J. S. REID ET AL   3,615,010
WASTE DISPOSAL SYSTEM
Original Filed Sept. 19, 1967
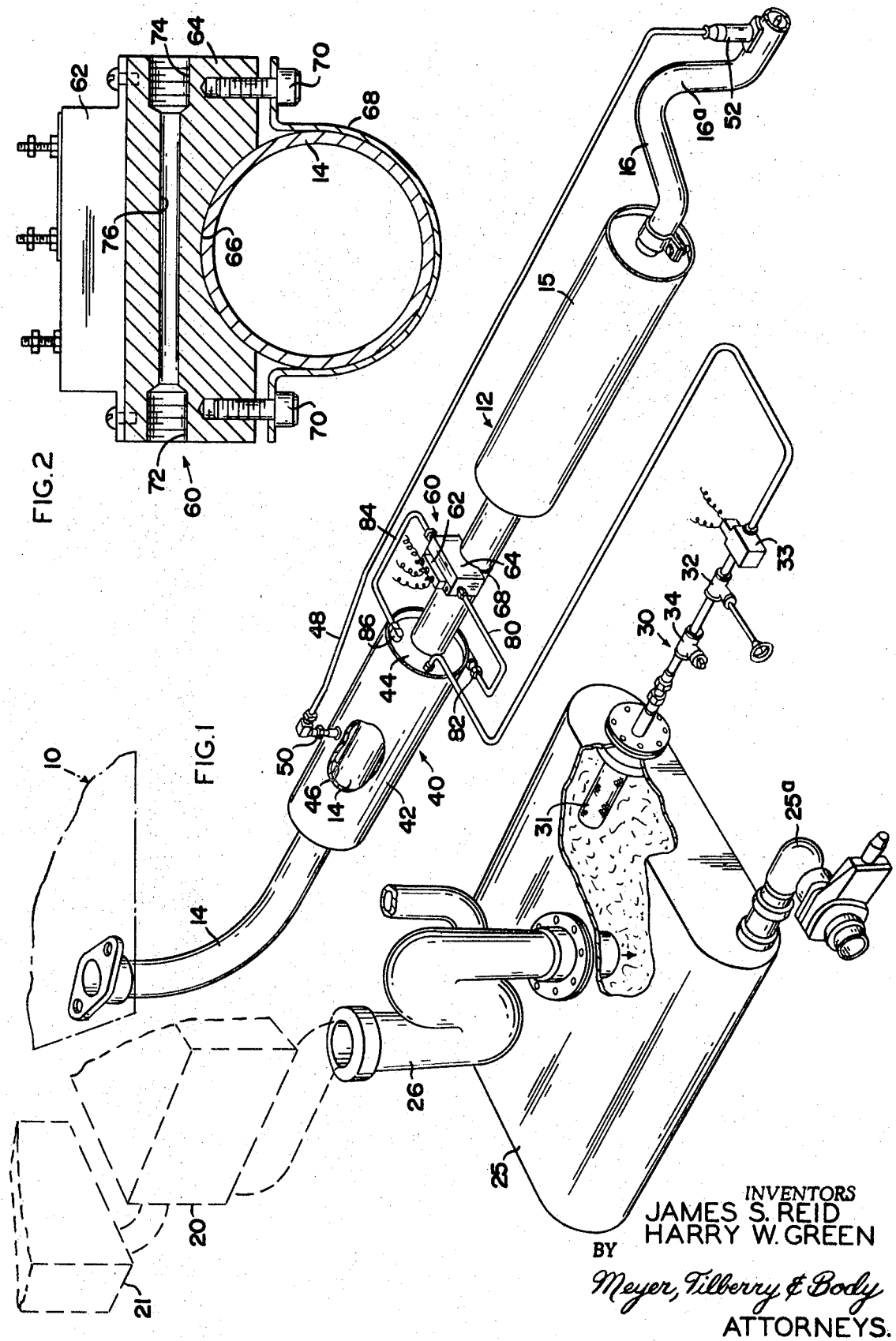
INVENTORS
JAMES S. REID
HARRY W. GREEN
BY
Meyer, Tilberry & Body
ATTORNEYS.

United States Patent Office 3,615,010
Patented Oct. 26, 1971

3,615,010
WASTE DISPOSAL SYSTEM
James S. Reid, Hudson, and Harry W. Green, North Olmsted, Ohio, assignors to The Standard Products Company, Cleveland, Ohio
Continuation of application Ser. No. 668,867, Sept. 19, 1967. This application Feb. 2, 1970, Ser. No. 7,448
Int. Cl. B01d 1/14
U.S. Cl. 210—65                                    12 Claims

ABSTRACT OF THE DISCLOSURE

A waste disposal system in which the exhaust system of a vehicular unit is employed to supply heat to a dissipatus drum in which liquid waste material is introduced. The flow of waste material into the drum is controlled by a pump actuated by a thermostatic pump control switch.

---

This application is a continuation of U.S. patent application Ser. No. 668,867 filed Sept. 19, 1967, and now abandoned.

This invention relates generally to improvements in waste disposal systems and, more particularly, to a disposal system especially designed for the disposal of human wate and/or other like disposable waste products.

Although not limited thereto, the waste disposal system of the present invention has particular utility for use in vehicular units such as buses, trucks, the more recently developed mobile homes, housetrailers, boats and various other types of vehicles utilized for human transportation. However, as will be hereinafter apparent, the instant disposal system may also find utility in domestic housing installations or the like where a conventional sewage system such as is presently in use in most large municipalities is not available.

There is disclosed in co-pending application, Ser. No. 454,416, filed May 10, 1965, now U.S. Pat. No. 3,342,337, and assigned to the assignee herein, an improved waste disposal system which overcomes many of the shortcomings of the prior art and which is particularly applicable for use in vehicular units and the like. The system is operable over extended periods of time without any evidence of an accumulation of waste material which would limit its period of use. Further the waste disposal system disclosed in that application is a completely self-contained unit whereby its operation prevents any contaminants from being discharged into the atmosphere and provides for the disposal of human waste products and/or the like while the vehicle is in transit.

The waste disposal system of the aforementioned application contemplates the use of a water closet, a waste tank which functions as a conventional septic tank, a dissipatus drum and a source of heat. The solid materials discharged from the water closet to the waste tank are attacked by anaerobic organisms which turn the solid material into a partially purified fluid solution. This solution is transmitted to the dissipatus drum and thereafter heated, vaporized and dissipated into the atmosphere either as a purified vapor or pure condensed liquid. The heat for the dissipatus drum may be provided by the exhaust gases of the engine which powers the vehicular unit.

Although the system disclosed in the aforesaid patent application operates entirely satisfactorily from the standpoint of dissipating collected waste material in the waste tank, the particular type of dissipatus apparatus disclosed therein does have certain shortcomings in its operation. Thus, when the vehicle is first started, a period of time is required in which to heat the dissipatus drum adequately to dissipate any liquid which may be introduced to the drum. During this period, there is a possibility that the drum may become flooded with liquid. The problem is particularly acute where a pump is employed in the system to supply the liquid to the drum so that if the drum is not fully heated sufficiently to vaporize the liquid in the drum, the liquid may pass through the system before being purified.

Accordingly, it is the primary object of this invention to provide an improved waste disposal system with improved dissipatus apparatus. In accordance with the primary aspect of this invention, the waste disposal system includes a pump which supplies liquid from the waste tank to the dissipatus drum with the actuation of the pump being controlled by a temperature responsive switch which prevents flooding of the dissipatus drum.

More particularly, the switch comprises a thermostatic control including a thermal block external of the dissipatus drum with the block being in intimate relationship to the exhaust system and subject to the heat generated by the gases passing through the system. A thermostatic switch is secured to the block and a fluid passage in the block is connected to the dissipatus drum so that as the liquid level in the drum approaches a predetermined level, the liquid is forced into the passage in the thermal block and cools the block thereby to actuate the thermostatic switch to discontinue the operation of the pump.

Other features and advantages of the improved waste disposal system of this invention will be apparent to those skilled in the art to which the system pertains upon reference to the following description and attached drawings wherein like reference numerals indicate like parts in the various views.

FIG. 1 is a perspective view of one embodiment of the improved waste disposal system incorporated for use in a vehicular unit.

FIG. 2 is a sectional view through the thermostatic switch mechanism employed in the system of FIG. 1.

Referring now to FIG. 1, the waste disposal system of the present invention is illustrated as adapted for use with a vehicle unit such as a bus, mobile home, boat, or the like and which includes a source of motive power, such as a gasoline engine schematically illustrated at 10. The engine includes the conventional exhaust system for discharging the by-products of combustion from the engine to the atmosphere. Typically, this exhaust assembly 12 includes an exhaust conduit 14 connected at one end to the exhaust manifold of the engine and at its opposite end to an elongated muffler device 15 of conventional construction. The opposite end of the muffler normally is connected to one end of a tail pipe 16 with the other end of the tail pipe including an upwardly projecting bend 16a which is somewhat of an inverted U-shaped configuration.

It will be readily understood that the hot exhaust gases emerging from the engine 10 pass through the conduit 14 into the muffler 15 and thence to the tail pipe conduit 16 whereby the gases are discharged to the atmosphere. It is these hot exhaust gases passing through the exhaust system 12 which are utilized to vaporize the fluids produced in the waste disposal system described hereinafter.

With particular reference to FIG. 1, the waste disposal system includes a conventional water closet, indicated by the reference numeral 20, which is located in the lavatory of the vehicle unit and which is designed to receive human waste products therein. A suitable flush tank 21 filled with a source of water or other fluids is connected to the water closet and provides the medium whereby the solid products are transported from the water closet to a waste tank shown at 25.

The waste tank 25 may be conveniently located exteriorly of the body of the vehicle unit so as to be readily available for cleaning maintenance and the like; however, its precise location is a matter of choice and forms no portion of this invention. A drain 25a may be provided on the waste tank 25 preferably adjacent the bottom thereof to facilitate cleaning of the tank.

The tank 25 is connected through a waste trap conduit 26 of conventional construction to the water closet 20. The waste tank 25 is a closed receptacle and receives the waste products and flushing fluid. The tank is constructed to function as a conventional septic tank whereby, in a manner well known, solid materials are digestively attacked by anaerobic organisms and are thereby turned, ultimately, with the fluid into a partially purified fluid solution.

An outlet conduit assembly, indicated generally by the reference numeral 30, is connected at one end to the waste tank 25 and includes a suitable screen type filter 31 which is located inside the waste tank. The filter 31 defines a liquid level wherein a substantially complete anaerobic process may be performed on the solid waste materials. It also functions to prevent any solids from escaping from the tank.

The outlet conduit assembly 30 also includes a suitable shut-off valve 32, an inline liquid pump 33 and a conventional T-fitting 34 which may be utilized to introduce a cleaning fluid to be passed through the tank in the event periodic maintenance and/or cleaning thereof is desired. The other end of the conduit assembly 30 is connected to a dissipatus apparatus, indicated generally by the reference numeral 40.

The dissipatus apparatus 40 comprises a cylindrical drum 42 which is received over and surrounds a section of the exhaust conduit 14 with the conduit passing through openings in the end walls 44 of the drum. The end walls of the drum may be rigidly secured to the conduit by welding or the like to define a closed annular interior heating chamber 46. A dissipatus tube 48 is connected at one end to a tap 50 in communication with the chamber 46 with the tube 48 extending longitudinally along the exhaust assembly and hence downwardly to a tap 52 in communication with the interior of the tail pipe 16.

The structure heretofore described comprises, in large part, the system illustrated in the aforementioned copending patent application and functions in the following manner. Waste material is deposited in the waste tank 25 where, as above-described, it is converted into a partially purified fluid solution. When the level of the liquid waste in the tank has risen to the level of the filter 31 and it is desired to dispose of this liquid material, the fluid is pumped by the pump 33, or through gravity, to the dissipatus apparatus 40 where it is deposited in the chamber 46. With the engine running and hot exhaust gases passing through the exhaust system 12, it is readily apparent that the interior of the drum 42 is raised to an elevated temperature so that the liquid therein is boiled and substantially vaporizes and thereafter passes out of the drum 42 through the tap 50. The vapor passing through the tap 50 into the dissipatus tube 48 becomes cooled and reverts partially or substantially to a fluid form. The conduit 48 normally is angularly directed downwardly toward the terminal portion of the tail pipe 16 so that the condensed fluid in the conduit 48 flows gravitationally toward the tail pipe where it is mixed with the exhaust gases and dissipated into the atmosphere. Since the fluid in the dissipatus apparatus is vaporized and subsequently condensed, it is purified so that the resultant gases or liquid discharged into the atmosphere through the tail pipe do not create any health hazards.

In using the above-described apparatus, and particularly when the pump 33 is employed, there is the distinct possibility that the liquid in the waste tank 25 may be deposited in the chamber 46 either at too great a rate for the liquid to be vaporized or the liquid may be introduced to the chamber 46 before the chamber has been sufficiently heated. In either case, there is a tendency to flood the chamber which may result in unpurified liquid passing through the tap 50 and out into the atmosphere.

To prevent such an occurrence, there is illustrated in FIG. 2 a temperature responsive switch mechanism adapted to control the actuation of the pump 33 so that the pump is actuated only after a predetermined temperature has been achieved in the exhaust assembly. The temperature responsive switch, indicated generally by the reference numeral 60, comprises a thermostatic switch 62 supported on a thermal block 64. The switch is connected by appropriate electrical connections to the pump 33. The thermal block 64 may be made from aluminum or any other suitable heat conductive metal and includes a semicircular recess 66 which is adapted to conform to and be received over the outer periphery of the exhaust conduit 14. Co-operating with the recess 66 is a retainer strap 68 which is connected by fasteners 70 to the thermal block 64 and which function to secure the switch 60 to the exhaust conduit. It is contemplated that the switch 60 will be located immediately adjacent the dissipatus apparatus 40 so that the temperature sensed by the switch is substantially the temperature present at the location of the drum 42.

A threaded inlet aperture 72 is provided in one side of the block 64 with a co-axial outlet aperture 74 provided on the opposite side of the block. A fluid passage 76 interconnects the inlet and outlet apertures. A fluid line 80 interconnects the inlet aperture 72 with a tap 82 located at the lower portion of the drum 42. In similar manner, a fluid line 84 interconnects the outlet aperture 74 with a tap 86 at the top of the drum 42.

The thermostatic switch 60 functions to control the operation of the pump 33 in the following manner. When the engine is first started and the exhaust system is cold, it is apparent that the dissipatus apparatus is ineffective to vaporize any liquid that might be introduced to the chamber 46. Accordingly, the thermostatic switch 62 is adjusted to maintain the pump 33 deactivated with the pump serving as a valve to prevent the flow of liquid into the chamber 46. As the system is heated and the heat is transferred through the conductive block 64 to the thermostatic switch 62, the switch activates the pump 33 and liquid is introduced to the chamber 46 where it is vaporized and dissipated in the above-described manner. The pump continues to operate to supply liquid to the chamber 46 until the liquid has risen in the drum 42 to a level where it flows through the fluid line 80 into the passage 76. As it enters the passage 76, the liquid tends to cool the thermal block 64 and as the liquid rises to fill the passage 76, the block is cooled down to a temperature such that the thermostatic switch 62 is activated to discontinue operation of the pump. As the liquid in the chamber 46 is boiled and vaporized, the liquid level in the drum drops and the liquid in the passage 76 returns to the drum. The passage 76 is then filled with steam and heated so that the switch is again actuated to start the pump and additional fluid is supplied to the dissipatus apparatus.

It is readily apparent that with the above-described thermostatic switch in combination with the disposal system herein described, any tendency for the drum 42 to be flooded is effectively prevented. Thus, the pump and switch act as a safety mechanism to assure that no unpurified liquid passes through the dissipatus tube 48.

Another advantage of this arrangement is in preventing distortion of the exhaust conduit 14. It sometimes occurs that the presence of a cool liquid around a portion of the exhaust conduit 14 with the remainder of the exhaust being at an elevated temperature will result in the conduit being distorted possibly ruptured. With the thermostatic control herein above-described, this condition may be eliminated. Thus, the passage 76 in the thermal block defines upper and lower limits for the liquid level in the chamber 46 which assures that the exhaust is wholly submerged in the liquid but at the same time avoids any flooding. In other words, the upper surface of the passage 76 functions as an upper limit for the liquid level while the lower surface of the passage 76 defines a lower limit for the liquid. Since the lower limit defined by passage 76 is above the level of the conduit 14, the device may be operated with the conduit at all times covered with the liquid.

Modifications and changes in the illustrated embodiment will suggest themselves to those having ordinary skill in the art. Changes such as these are contemplated by the principles of this invention so that, although for ease of description, the principles of the invention have been set forth in connection with but a single illustrated embodiment, it is not intended that this embodiment, or the terminology employed in describing it, is to be limiting but, rather, it is our desire to be restricted only by the scope of the appended claims.

Havings thus described our invention, we claim:

1. An improved waste disposal system including, in combination, a power source for generating waste heated gases, said disposal system including an exhaust system through which the heated gases may pass and a waste tank for receiving liquid waste material, vaporizing means operative to employ the waste heat in said exhaust system for vaporizing the waste liquid in said tank and supply means operative to supply liquid from said tank to said vaporizing means, the improvement comprising:
means responsive to the temperature in said exhaust system for controlling actuation of said supply means.

2. The improvement of claim 1, wherein said temperature responsive means includes means responsive to the volume of liquid in said vaporizing means for controlling actuation of said supply means.

3. The improvement of claim 2, wherein said vaporizing means comprises container means;
said exhaust system including means for heating the liquid in said container means and effective to vaporize the liquid therein; and
said temperature responsive means including means for sensing the temperature of said exhaust system.

4. The improvement of claim 3, wherein said temperature responsive means further includes fluid passage means in fluid communication with the interior of said container means.

5. The improvement of claim 1, wherein said vaporizing means comprises;
drum means defining a fluid chamber in heat transfer relation to a portion of said exhaust system;
said temperature responsive means including means operative to sense the temperature of said portion of said exhaust system.

6. The improvement of claim 1, wherein said temperature responsive means comprises a heat conductive block in heat transfer relation with said exhaust system;
thermostatic switch means supported on said block;
passage means through said block; and
conduit means interconnecting said passage means with said vaporizing means.

7. The improvement of claim 6, wherein said passage means is located in said block above the level of said exhaust system.

8. The improvement of claim 5, wherein said temperature responsive means includes means responsive to the volume of liquid in said chamber for controlling the actuation of said supply means whereby the level of liquid in said chamber is maintained within predetermined limits.

9. The improvement of claim 6, wherein said conduit means comprises a first fluid line connecting one end of said passage means to said vaporizing means and a second fluid line connecting the other end of said passage means to said vaporizing means at a point vertically spaced from the first.

10. The improvement of claim 1 and further including means responsive to the volume of liquid in said vaporizing means for controlling actuation of said supply means.

11. An improved waste disposal system including, in combination, a power source for generating waste heated gases, said disposal system including an exhaust system through which the heated gases may pass and a waste tank for receiving liquid waste materials, flow means for feeding the waste material from said waste tank to said exhaust system whereby the heat of said exhaust gases may be utilized to dispose of said waste material, the improvement comprising:
means responsive to the temperature in said exhaust system for controlling operation of said flow means whereby said flow means is actuated only when said exhaust system reaches a pre-determined temperature and renders said flow means inoperative when said exhaust system is below said pre-determined temperature.

12. A method of disposing of waste material from a waste tank by using a power source which generates waste heated gases and which source includes an exhaust system through which the heated gases may pass, the method comprising the steps of:
providing a heat sensing means capable of generating a signal when the temperature sensed reaches a predetermined level,
employing the heat sensing means to sense the temperature of the exhaust system,
transmitting the signal generated by the sensing means to a flow control means for actuating the flow control means,
withdrawing liquid from the waste tank through the actuated flow control means, and
utilizing the heated exhaust gases to dispose of the waste material.

References Cited
UNITED STATES PATENTS

| | | | |
|---|---|---|---|
| 2,998,139 | 8/1961 | Novak | 210—71 X |
| 3,342,337 | 9/1967 | Reid | 210—71 X |

REUBEN FRIEDMAN, Primary Examiner

U.S. Cl. X.R.

210—110, 149, 152, 181